(12) United States Patent
Goto et al.

(10) Patent No.: US 8,281,007 B2
(45) Date of Patent: Oct. 2, 2012

(54) CLUSTER CONTROL APPARATUS, CLUSTER CONTROL METHOD, AND COMPUTER PRODUCT

(75) Inventors: Masanori Goto, Kawasaki (JP); Kouichi Kumon, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 187 days.

(21) Appl. No.: 11/487,410

(22) Filed: Jul. 17, 2006

(65) Prior Publication Data

US 2007/0233870 A1 Oct. 4, 2007

(30) Foreign Application Priority Data

Mar. 28, 2006 (JP) ................................. 2006-089042

(51) Int. Cl.
*G06F 15/173* (2006.01)
(52) U.S. Cl. .................... 709/225; 709/223; 709/224
(58) Field of Classification Search .................. 709/223, 709/224, 225
See application file for complete search history.

(56) References Cited

U.S. PATENT DOCUMENTS

| 5,845,081 A * | 12/1998 | Rangarajan et al. .......... 709/224 |
| 6,823,382 B2 * | 11/2004 | Stone .............................. 709/224 |
| 6,859,889 B2 | 2/2005 | Matsuura et al. |
| 6,959,337 B2 * | 10/2005 | McLaughlin et al. ........ 709/229 |
| 7,350,098 B2 | 3/2008 | Colrain et al. |
| 7,475,127 B2 | 1/2009 | Colrain et al. |
| 7,548,973 B2 | 6/2009 | Colrain et al. |
| 2002/0161891 A1 | 10/2002 | Higuchi et al. |
| 2005/0193227 A1 | 9/2005 | Nakahara et al. |
| 2005/0197718 A1 | 9/2005 | Shin et al. |
| 2006/0010031 A1 | 1/2006 | Higuchi et al. |

FOREIGN PATENT DOCUMENTS

| JP | 08-278909 | 10/1996 |
| JP | 9-81409 | 3/1997 |
| JP | 11-126195 | 5/1999 |
| JP | 2001-092680 | 4/2001 |
| JP | 2001-155003 | 6/2001 |
| JP | 2001-306349 | 11/2001 |
| JP | 2002-108839 | 4/2002 |
| JP | 2002-123406 | 4/2002 |
| JP | 2002-323986 | 11/2002 |
| JP | 2005-512190 | 4/2005 |
| JP | 2005-234917 | 9/2005 |
| JP | 2005-250840 | 9/2005 |
| JP | 2005-251055 | 9/2005 |
| WO | 03/048934 A2 | 6/2003 |

OTHER PUBLICATIONS

Japanese Office Action issued Jun. 8, 2010 in corresponding Japanese Patent Application 2006-089042.
Japanese Office Action issued Oct. 6, 2010 in corresponding Japanese Patent Application 2006-089042.
Japanese Office Action issued Mar. 2, 2010 in corresponding Japanese Patent Application 2006-089042.

\* cited by examiner

*Primary Examiner* — Adnan Mirza
(74) *Attorney, Agent, or Firm* — Staas & Halsey LLP (57) ABSTRACT

A cluster control apparatus controls an allocation of a job to each node in a cluster system formed by mutually connecting a plurality of nodes by a high-speed network. A node selecting unit selects an allocation node for allocating the job and a similar node that is similar to the allocation node. A data-redundancy command unit issues a command to store data created from the job executed by the allocation node in the allocation node and the similar node.

11 Claims, 9 Drawing Sheets

| JOB NUMBER | JOB STATUS | ALLOCATED NODE |
|---|---|---|
| 1 | COMPLETED | #1 |
| 2 | ON-HOLD | #3,#4,#5,#6 |
| 3 | EXECUTION | #2 |
| 4 | QUEUE | |
| | ⋮ | |

FIG.3B

| NODE NUMBER | NODE STATUS |
|---|---|
| NODE #1 | EMPTY |
| NODE #2 | JOB EXECUTION |
| NODE #3 | STOPPED |
| | ⋮ |

FIG.3C

| NODE NUMBER | PARTNER-DESTINATION NODE NUMBER |
|---|---|
| NODE #1 | NODE #2 |
| NODE #2 | NODE #1 |
| NODE #3 | NONE |
| | ⋮ |

CLUSTER CONTROL APPARATUS, CLUSTER CONTROL METHOD, AND COMPUTER PRODUCT

BACKGROUND OF THE INVENTION

1. Field of the Invention

The present invention relates to a technology for controlling an allocation of a job to each node in a cluster system including a plurality of nodes mutually connected by a high-speed network.

2. Description of the Related Art

Recently, in the field of high performance computing, personal computers (PCs) that utilize inexpensive commodity hardware are tending to be used instead of supercomputers as calculators. Since performance is limited on a single PC, high performance is realized by mutually connecting many PCs via a special-purpose high-speed interconnect to form a cluster.

In large-scale computing using such a cluster, while parallel applications over long periods must be operated while communicating by nodes, when a failure occurs in the cluster, even if the failure occurs in just one node, in a worst case computation results at all nodes in the cluster can be lost. To minimize such loss of computation results, checkpoint data is output while executing parallel applications and stored regularly. Based on this checkpoint data, when the failure occurs, a computation can be restored from the last checkpoint that has been stored. This function of regularly storing checkpoint data is a minimum requirement regardless of the scale of the cluster.

Generally, methods for storing data such as checkpoint data in a cluster system broadly divide into shared disk methods of storing a batch of data in network storage such as a storage area network (SAN) and a network attached storage (NAS), and mirror disk methods of using a disk device provided at the nodes and making data redundant between many nodes. There is a tradeoff between the scale of data these methods handle and their installation costs.

While the shared disk method is suitable for handling large-scale data, there is a disadvantage that, since simultaneous write operations to the shared disk are often generated together from jobs executed in series applications, high reliability is demanded of the shared disk to withstand such enormous disk accesses, and this increases the installation cost.

While the mirror disk method can be configured inexpensively with providing an expensive shared disk such as a SAN, and is already widely used in small-scale clusters of approximately two web servers of the like, there is a disadvantage that, since a network load is applied when making the data redundant, this method is not suitable for systems that handle large-scale data.

Mirror disk methods can be divided more precisely into two types. There are active/standby type methods in which, when making redundant data between two nodes, one node is deemed an active node used in executing normal applications and another is made a standby node used only in storing data executed by the active node (see, for example, Japanese Patent Application Laid-open No. 2002-123406), and there are active/active type methods in which the two nodes both include active and standby functions and make their data mutually redundant.

Among the active/active type methods, mirror disk type clusters arranged such that both nodes execute different applications (hereinafter, "mutual standby type") have an advantage in that, unlike from mirror disk type clusters of other arrangements, each node can be used efficiently. If a cluster system using this mutual standby type can be applied in a large-scale cluster system configured from many nodes, the scale of the cluster system can be expanded with an inexpensive configuration.

However, the mirror disk type cluster technique including the mutual standby type assumes a small-scale cluster system of approximately two to four nodes, and is problematic in not considering a determination reference for freely changing the partner destination node when data is made redundant. When a partner destination node for making data redundant is randomly determined, this increases network band consumption and increases overhead caused by differences in processing speeds between nodes, whereby the processing capability of the entire cluster deteriorates. Consequently, it becomes impossible to obtain a computation processing capability that matches the scale of the cluster.

SUMMARY OF THE INVENTION

It is an object of the present invention to at least partially solve the problems in the conventional technology.

A computer-readable recording medium according to one aspect of the present invention stores therein a computer program for controlling an allocation of a job to each node in a cluster system formed by mutually connecting a plurality of nodes by a high-speed network. The computer program causes a computer to execute node selecting including selecting an allocation node for allocating the job and a similar node that is similar to the allocation node; and command issuing including issuing a command to store data created from the job executed by the allocation node in the allocation node and the similar node.

A method according to another aspect of the present invention is for controlling an allocation of a job to each node in a cluster system formed by mutually connecting a plurality of nodes by a high-speed network. The method includes node selecting including selecting an allocation node for allocating the job and a similar node that is similar to the allocation node; and command issuing including issuing a command to store data created from the job executed by the allocation node in the allocation node and the similar node.

A cluster control apparatus according to still another aspect of the present invention controls an allocation of a job to each node in a cluster system formed by mutually connecting a plurality of nodes by a high-speed network. The cluster control apparatus includes a node selecting unit that selects an allocation node for allocating the job and a similar node that is similar to the allocation node; and a data-redundancy command unit that issues a command to store data created from the job executed by the allocation node in the allocation node and the similar node.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below in detail with reference to the accompanying drawings.

Figure 1A:
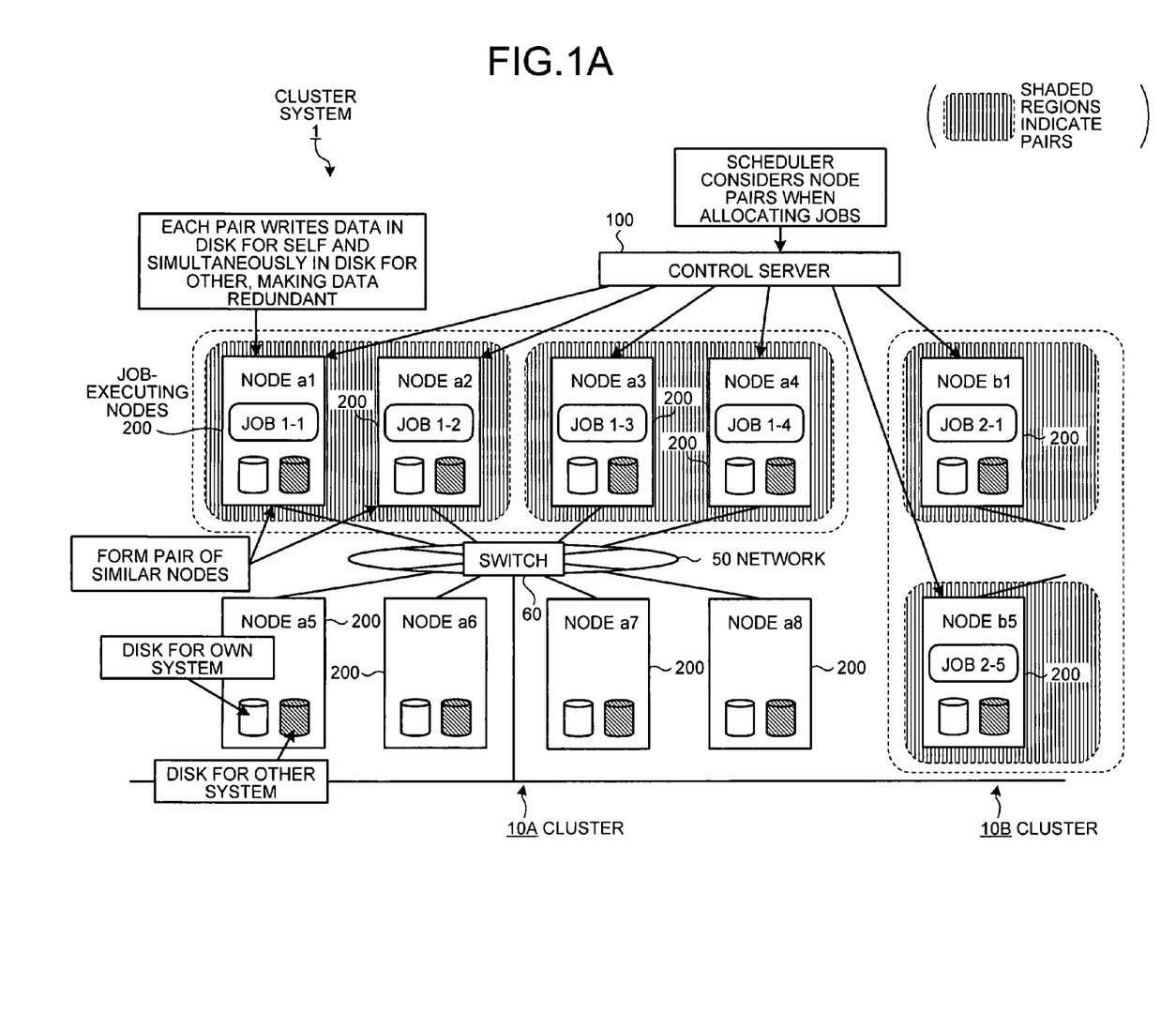
FIG. 1A is an explanatory diagram of a configuration of a cluster system according to an embodiment of the present invention.

FIG. 1A is an explanatory diagram of the configuration of a cluster system 1 according to an embodiment of the present invention. The cluster system 1 is formed by connecting many clusters such as a cluster 10A, formed by mutually connecting many job-executing nodes 200 (there are eight, "node a1" to "node a8") via a high-speed network 50, and another cluster 10B formed by job-executing nodes 200 such as "node b1" and "node b5". A control server 100 inputs jobs to the job-executing nodes 200 and receives results of the executed jobs from the job-executing nodes 200.

In FIG. 1A, the control server 100 allocates parallel application jobs "Job 1-1" to "Job 1-4" for execution by four nodes, to four job-executing nodes in the cluster 10A configured by the job-executing nodes 200 of "node a1" to "node a8", and allocates other parallel application jobs of different types ("Job 2-1", "Job 2-5", or the like) to the cluster 10B that forms a different cluster to that of the cluster 10A.

In allocating jobs to the job-executing nodes 200, the control server 100 arranges two pairs of job-executing nodes 200 indicated by regions of vertical lines, and, to counter failures, makes data such as checkpoint data and execution midway results output when jobs are executed redundant between the two job-executing nodes 200 of each pair.

However, since the pairs are arranged randomly, when data output during jobs is made mutually redundant between the two job-executing nodes 200, the processing capability of the entire cluster deteriorates due to increased network band consumption, increased overhead caused by differences in processing speeds between nodes, and so on.

Accordingly, the control server 100 selects two similar job-executing nodes 200 from the job-executing nodes 200 and arranges them in a pair. Specifically, the control server 100 selects two mutually similar job-executing nodes 200 whose network distances are short and whose positions are similar, or two job-executing nodes 200 whose job processing speeds and processing capabilities are similar, and arranges them in pairs. Data output by jobs is then made redundant between these pairs of similar job-executing nodes 200.

For example, data such as execution results from the job "Job 1-1" allocated to the job-executing node 200 of "node a1" are stored in a disk belonging to "node a1" itself (disk for own system), and a disk belonging to a job-executing node 200 of "node a2" (disk for other system) that is similar to the job-executing node 200 of "node a1" and is arranged in a pair with it, and data of that job is made redundant. The same goes for the job "Job 1-2 allocated to the job-executing node 200 of "node a2", execution results and the like of this job being stored in the disk belonging to "node a2" itself (disk for own system), and the disk belonging to the job-executing node 200 of "node a1" (disk for other system) that is similar to the job-executing node 200 of "node a1" and is arranged in a pair with it, and data of that job being made redundant. Data output by jobs is thereby made mutually redundant between pairs of similar job-executing nodes 200.

Thus, from the job-executing nodes 200, the control server 100 selects a node that a particular job is allocated to and a node that is similar to that node, and makes a command such that data such as job execution results are stored at the node that the job is allocated to and at the similar node, whereby the load on the overall cluster can be suppressed to a minimum while data is made redundant between those nodes.

Figure 1B:
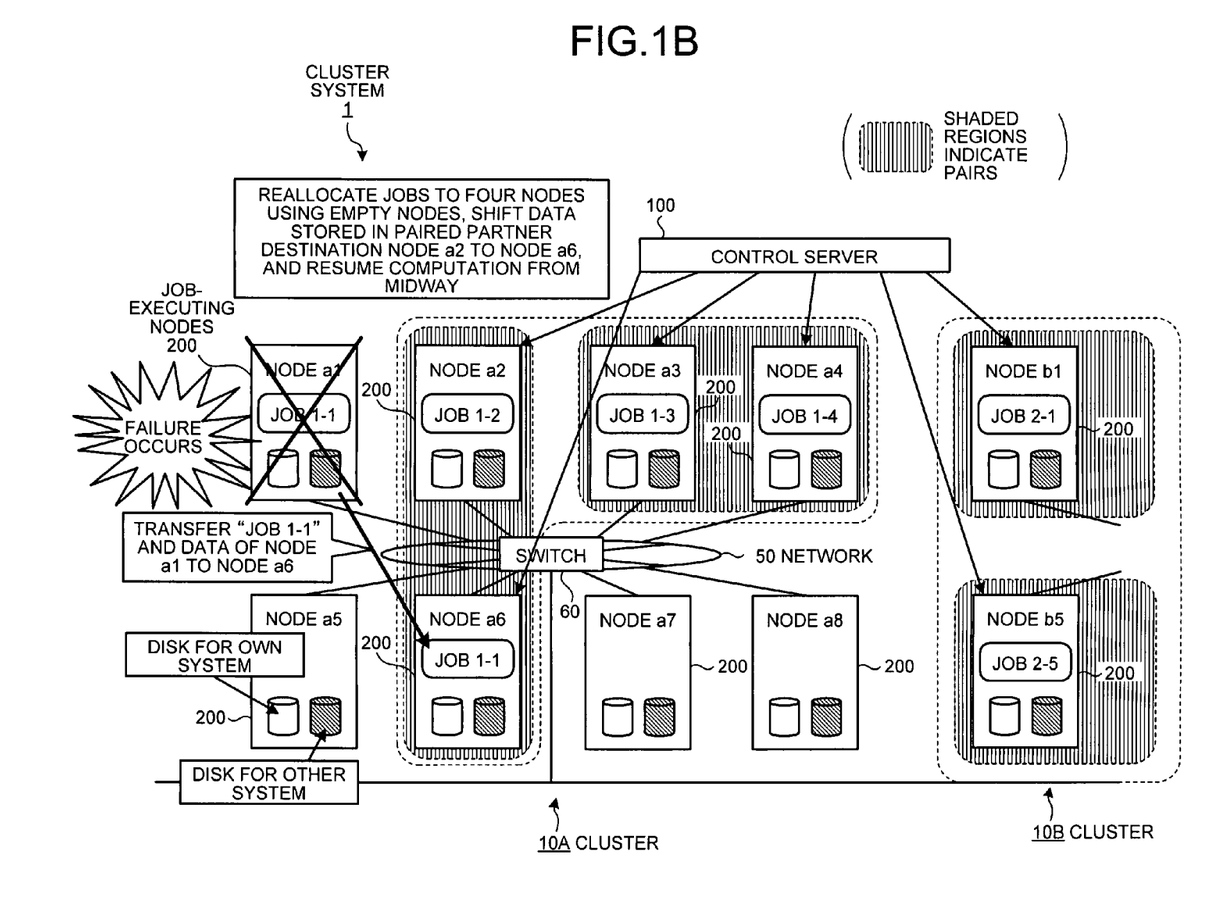
FIG. 1B is an explanatory diagram of an operation of a control server when a failure occurs.

When a failure occurs at a job-executing node 200 in the cluster system 1, the control server 100 transfers jobs and data stored at the failure node at the time the failure occurred to a substitute node that will replace the failure node, and makes the substitute node resume the computation from midway. FIG. 1B is an explanatory diagram of an operation of the control server 100 when a failure occurs.

As shown in FIG. 1B, when a failure occurs at the job-executing node 200 "node a1", the control server 100 detects the failure at "node a1", and selects a substitute node (in this example, "node a6") for the failed "node a1" from among the empty nodes. The control server 100 arranges this substitute node "node a6" in a new pair with a partner destination node "node a2" that has been paired with "node a1".

The control server 100 allocates a job held by the failure node "node a1" to the substitute node (here, "node a6"), and restores the data held by the "node a2" that has been paired with the failed "node a1" by copying it to the "node a6", thereby transferring the job and data held by the "node a1" to the substitute "node a6". The control server 100 then commands these two newly paired job-executing nodes 200 "node a2" and "node a6" to resume execution of the job from midway based on the restored checkpoint data at that point.

Thus the control server 100 detects a failure node where a failure occurs from among the job-executing nodes 200, and, when it detects a failure, selects a substitute node from among the nodes and transfers the job and the data held at the node paired with the failure node to the substitute node. Therefore, the job and the data held by the failure node prior to the failure occurring can be transferred to the substitute node.

Figure 2:
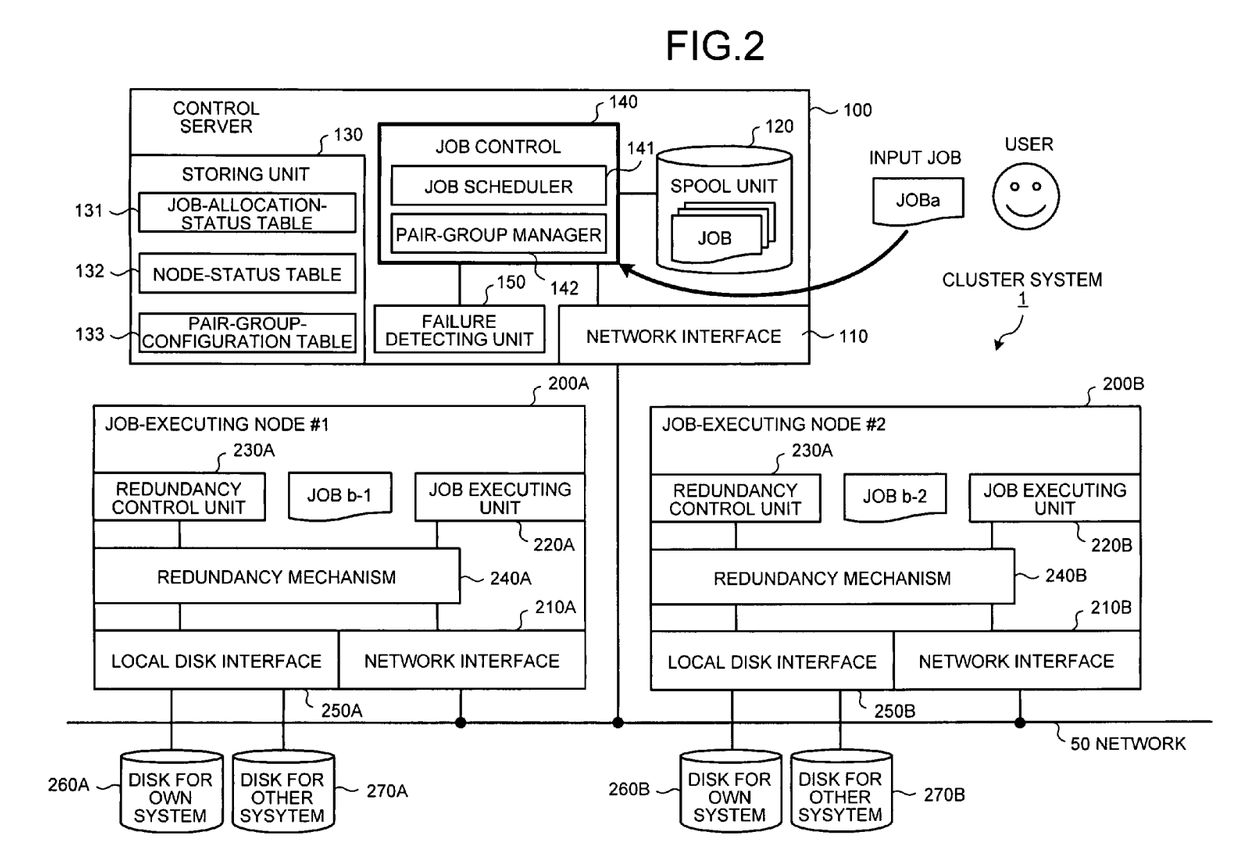
FIG. 2 is a functional block diagram of a configuration of the cluster system according to the present embodiment.

FIG. 2 is a functional block diagram of a configuration of the cluster system 1 according to the present embodiment. As shown in FIG. 2, in the cluster system 1, the network 50 connects the control server 100 to two job-executing nodes 200A and 200B via a switch (not shown), forming one cluster. The two job-executing nodes 200A and 200B are arranged in a pair, with data such as execution midway-results and checkpoint data output during execution of jobs being made mutually redundant between the two job-executing nodes 200A and 200B and stored accordingly.

While only the two job-executing nodes 200A and 200B are shown for the sake of convenience in the explanation, the cluster system 1 actually includes many job-executing nodes as shown in FIGS. 1A and 1B, these being mutually connected in one cluster and further connected to other clusters by switches (not shown). In the present invention, the job-executing nodes 200A and 200B are referred to simply as "job-executing nodes 200", when not making a distinction between them as job-executing nodes 200A, 200B, and so on.

The control server 100 is a server device that manages jobs allocated to the job-executing nodes 200 and also manages the configurations of pairs that they are arranged into. The control server 100 includes a network interface 110, a spool unit 120, a storing unit 130, a job control unit 140, and a failure detecting unit 150.

The network interface 110 enables connection to the job-executing nodes 200 via the network 50, transmitting job data input by users to the job-executing nodes 200 and receiving job execution results that are returned to the control server 100 by the job-executing nodes 200 after they execute the jobs. The spool unit 120 is a storage device that stores job data input by users via an input interface (not shown).

The storing unit 130 is a storage device that stores execution statuses of jobs stored in the spool unit 120, statuses of the job-executing nodes 200, and so on, and includes a job-allocation-status table 131, a node-status table 132, and a pair-group-configuration table 133.

Figure 3A:
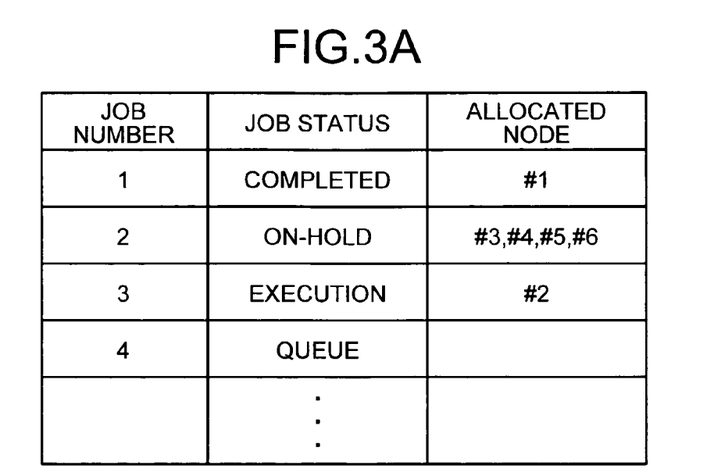
FIG. 3A is an example of a job-allocation-status table.

The job-allocation-status table 131 stores current execution statuses of jobs input by users. FIG. 3A is an example of the job-allocation-status table 131. As shown in FIG. 3A, the job-allocation-status table 131 stores a job number of an input job, a job status that indicates the current execution status of that job, and an allocation node that indicates a node that the job is allocated to, in correspondence together.

As the job statuses, jobs waiting to be allocated to the job-executing nodes 200 stored in the spool unit 120 are indicated as "Queue", jobs being executed by the job-executing nodes 200 as "Execution", jobs whose execution is on hold due to node breakdown or the like are indicated as "On-Hold", and jobs that are complete and whose execution results have been received from the job-executing nodes 200 are indicated as "Completed". When a job execution result is extracted by a user after the job status reaches "Completed", data relating to that job is deleted from the job-allocation-status table 131.

Figure 3B:
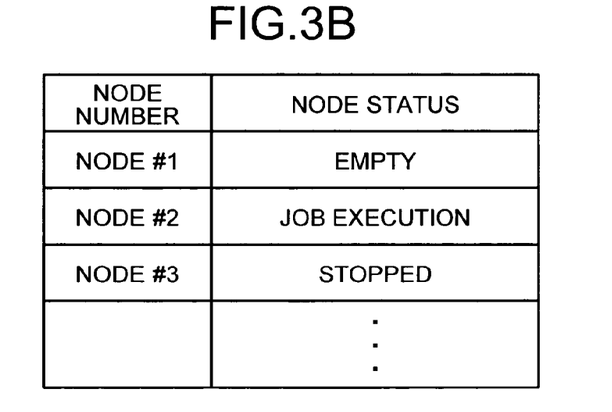
FIG. 3B is an example of a node-status table.

The node-status table 132 stores statuses of each of the job-executing nodes 200 in the cluster system 1. FIG. 3B is an example of the node-status table 132. The node-status table 132 stores a node number of the job-executing node 200 corresponding to a node status at that node.

As the node statuses, nodes that are not executing jobs and are waiting for job allocations from the control server 100 are indicated as "Empty", nodes executing jobs as "Job Execution", and nodes that have stopped due to breakdown or the like and are incapable of executing jobs as "Stopped".

Figure 3C:
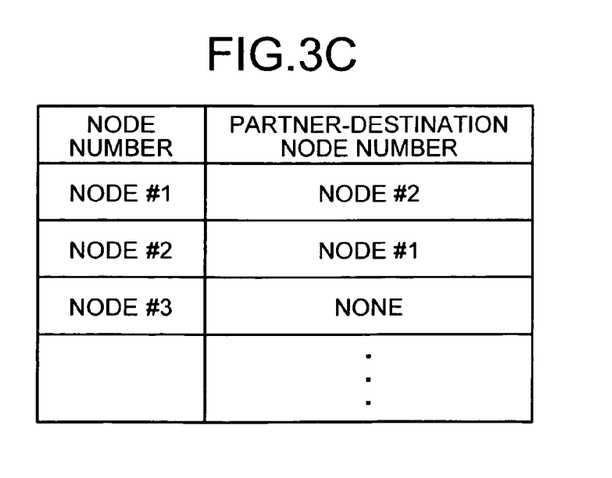
FIG. 3C is an example of a pair-group-configuration table.

The pair-group-configuration table 133 stores configurations of pairs formed in each of the job-executing nodes 200. FIG. 3C is an example of the pair-group-configuration table 133. As shown in FIG. 3C, the pair-group-configuration table 133 stores a node number of a job-executing node 200 corresponding to a partner-destination node number indicating its partner destination node when data that is output by executing a job at that node is stored in another node and made redundant.

In FIG. 3C, node #1 is the partner destination node of node #2, and vice versa. That is, node #1 and node #2 are arranged in a pair, and data is made mutually redundant between these two nodes. Nodes for which no partner destination node is specified and are not paired with another node are given a partner-destination node number of "None".

After storing data of jobs input from users in the spool unit 120, the job control unit 140 allocates those jobs to the job-executing nodes 200 and also specifies partner destination nodes when data output by executing those jobs is made redundant. The job control unit 140 includes a job scheduler 141 and a pair-group manager 142.

The job scheduler 141 determines execution sequences for jobs input from users, and allocates the jobs to the job-executing nodes 200 based on information such as the number of nodes required. Information used in allocating the jobs is contained in job data as job control command information, together with a job execution script, an input data file, and such like.

When the job scheduler 141 allocates a job to a job-executing node 200, it updates the job-allocation-status table 131 according to the execution status of that job, and stores the execution status of a job at the job-executing node 200 that the job is input to in the node-status table 132.

Wherever possible, the job scheduler 141 allocates jobs of mutually similar types to two mutually similar job-executing nodes 200. Specifically, the control server 100 allocates two jobs "Job b-1" and "Job b-2" of mutually similar types to the two job-executing nodes 200A and 200B whose network distances are short and whose positions are similar. Alternatively, the control server 100 allocates the two jobs "Job b-1" and "Job b-2" of mutually similar types to the two job-executing nodes 200A and 200B whose job processing speeds and processing capabilities are similar.

The pair-group manager 142 manages the configurations of the pairs of job-executing nodes 200, and makes data mutually redundant between them. The pair-group manager 142 arranges two job-executing nodes 200 of mutually similar types selected by the job scheduler 141 into a pair, and stores the result in the pair-group-configuration table 133. Based on the pair-group-configuration table 133, the pair-group manager 142 notifies the job-executing nodes 200 of partner destination nodes that will be the storage destinations of data output when the job-executing nodes 200 execute the jobs, and makes the data mutually redundant between the paired job-executing nodes 200.

In this manner, the job scheduler 141 selects an allocation node that jobs are allocated to and a node similar to that node from the job-executing nodes 200, and the pair-group manager 142 makes a command such that data of jobs executed by the selected allocation node is stored at the allocation node and at the similar node. Accordingly, the load on the overall cluster can be suppressed to a minimum while making data redundant between the nodes.

When a failure occurs, the pair-group manager 142 determines, based on the job control command information contained in the data of the job, whether to continue and allow the job to be executed even during breakdown of the disk device, or to transfer the job and the data to a substitute node and immediately resume the job.

The failure detecting unit 150 detects all types of failures that occur in the job-executing nodes 200 of the cluster system 1. Specifically, the failure detecting unit 150 detects disk failure in the disk device of each job-executing node 200, node failure in CPUs, interfaces, or controllers of the job-executing nodes 200, and network failure between the job-executing nodes 200 and switches. When the failure detecting unit 150 detects a failure, the job control unit 140 performs a process of transferring the job and the data of the node where the failure occurred to a substitute node.

The job-executing node 200A executes a job allocated by the control server 100, returns an execution result of the job to the control server 100, and transmits data such as execution midway results and checkpoint data output during execution of the job to its partner destination node, namely the job-executing node 200B. The job-executing node 200A includes a network interface 210A, a job executing unit 220A, a redundancy control unit 230A, a redundancy mechanism 240A, and a local disk interface 250A. Two disk devices (disk for own system 260A and disk for other system 270A) are connected to the local disk interface 250A. Instead of using two disk devices, one disk device can be divided into two regions and used for self and for other.

The network interface 210A connects via the network 50 to the control server 100 and the other job-executing node 200B. The network interface 210A receives job data transmitted from the control server 100, transmits data output by executing that job to the job-executing node 200B specified by the partner destination node, and, when the job is completed, transmits an execution result of the job to the control server 100.

The job executing unit 220A executes jobs transmitted from the control server 100 and outputs data of the jobs, such as execution midway results and checkpoint data.

The redundancy control unit 230A controls the redundancy mechanism 240A, and stores information relating to the partner destination node specified by the pair-group manager 142 of the control server 100. Data that is output when the job executing unit 220A executes a job is stored in the disk for own system 260A of the job-executing node 200A itself, and also in a disk for other system 270B at the partner destination node (job-executing node 200B) stored by the redundancy control unit 230A, the data being made redundant between the two job-executing nodes 200A and 200B.

The redundancy mechanism 240A makes redundant data such as checkpoint data output by the job executing unit 220A, and is provided in the form of a disk driver. Specifically, the redundancy mechanism 240A writes data of the job "Job b-1", executed by the job executing unit 220A of the job-executing node 200A, to the disk for own system 260A via the local disk interface 250A. In addition, the redundancy mechanism 240A receives data of the job "Job b-2", executed by a job executing unit 220B of the job-executing node 200B specified by the partner destination node, from the network interface 210A and writes it to the disk for other system 270A via the local disk interface 250A. The data is thereby made redundant.

The local disk interface 250A reads/writes data from/to the disk for own system 260A and the disk for other system 270A. When reading data, the local disk interface 250A reads only data that is stored in the disk for own system 260A.

The job-executing node 200B is a computation device whose configuration is similar to that of the job-executing node 200A. Similarly, a redundancy mechanism 240B of the job-executing node 200B writes data of the job "Job b-2", executed by the job executing unit 220B of the job-executing node 200B, to a disk for own system 260B via a local disk interface 250B. In addition, the redundancy mechanism 240B receives data of the job "Job b-1", executed by the job executing unit 220A of the job-executing node 200A specified by the partner destination node, from a network interface 210B and writes it to the disk for other system 270B via the local disk interface 250B.

Data of jobs executed by the two job-executing nodes 200A and 200B is made redundant, and the redundant data is stored in the disks for own system 260A and 260B and in the disks for other system 270A and 270B.

Other units of the job-executing node 200B are the same as those of the job-executing node 200A and will not be repetitiously explained.

Figure 4:
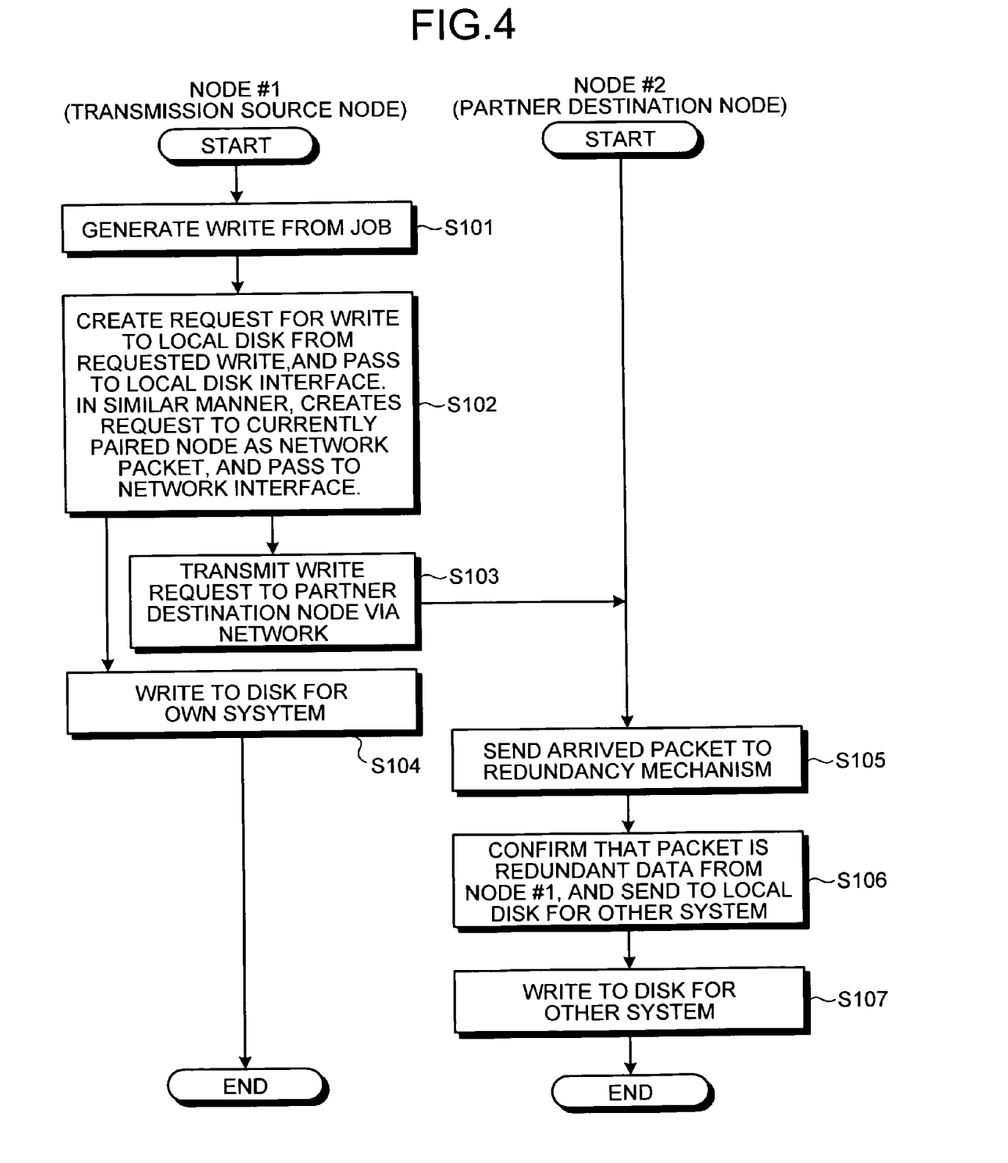
FIG. 4 is a flowchart of a process procedure of data redundancy performed by two job-executing nodes.

FIG. 4 is a flowchart of the process procedure of the data redundancy performed by the two job-executing nodes 200A and 200B.

In this example, the pair-group manager 142 of the control server 100 arranges the job-executing node 200A (node #1) and the job-executing node 200B (node #2) in a pair, node #1 being a data transmission source node, and node #2 being a partner destination node that stores data transmitted from the transmission source node.

As shown in FIG. 4, when the job executing unit 220A on the node #1 side executes a job, and execution midway results and checkpoint data output during execution of the job are to be written to the disk device (step S101), the redundancy mechanism 240A on the node #1 side creates a write request to the local disk (disk for own system 260A) and passes the data to the local disk interface 250A. Based on information indicating the partner destination node stored by the redundancy control unit 230A, the redundancy mechanism 240A creates a network packet that includes the data and passes it to the network interface 210A to write the data to the disk for other system 270B of the job-executing node 200B (step S102).

The network interface 210A on the node #1 side transmits the network packet created by the redundancy mechanism 240A to the partner destination node, namely node #2 (step S103). The local disk interface 250A on the node #1 side writes the data received from the redundancy mechanism 240A to the disk for own system 260A (step S104), whereby data writing on the node #1 side ends.

On the node #2 (partner destination node) side, when the network interface 210B receives the network packet transmitted from the network interface 210A on the node #1 (transmission source node) side in step S103, the network interface 210B sends the arrived packet to the redundancy mechanism 240B on the node #2 side (step S105).

The redundancy mechanism 240B on the node #2 side confirms that the received packet is a redundant data of the job transmitted from node #1, and passes the data to the local disk interface 250B on the node #2 side (step S106).

The local disk interface 250B on the node #2 side writes the data received from the redundancy mechanism 240B to the disk for other system 270B (step S107), whereby data writing on the node #2 side ends.

When node #1 is specified as the partner destination node of node #2, the transmission source node and the partner destination node are switched round such that node #2 becomes the transmission source node and node #2 becomes the partner destination node. The process described above is performed in that arrangement, and data is made mutually redundant between nodes #1 and #2. When the command specifies that the pair must not be canceled until the job is complete, even if the job control command information indicates that the disk for own system 260A has broken down, the job-executing node 200A makes a write access via the network 50 only to the job-executing node 200B that is it paired with.

When a read process is generated for data while the job-executing node 200A is executing the job, the data stored in the disk for own system 260A is extracted directly from the job-executing node 200A via the local disk interface 250A.

Figure 5:
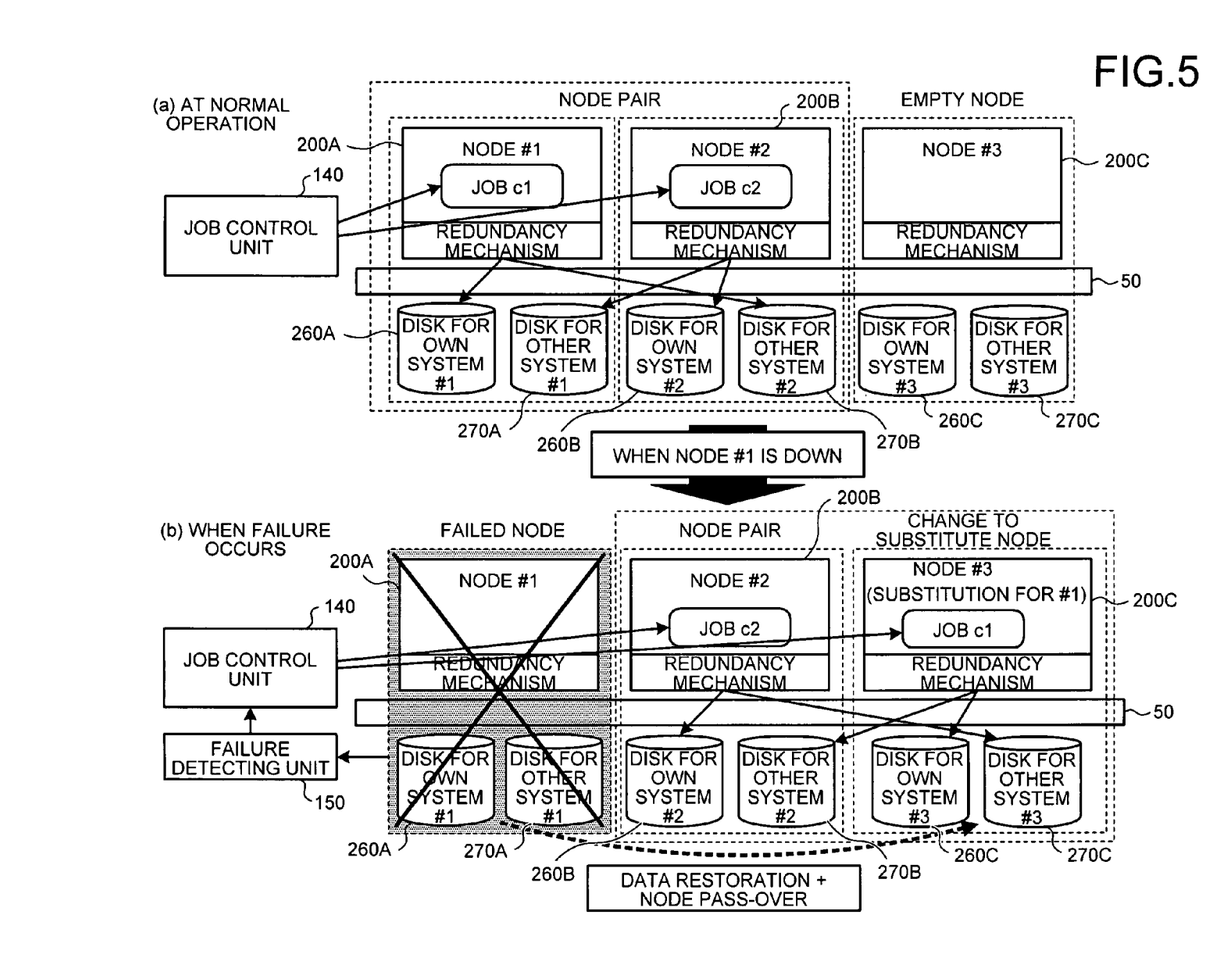
FIG. 5 is an explanatory diagram of a method of transferring from a failure node to a substitute node.

FIG. 5 is an explanatory diagram of a method of transferring from a failure node to a substitute node. As shown in FIG. 5A, three job-executing nodes 200A, 200B, and 200C are mutually connected via the network 50. During a normal operation, the job-executing node 200A of node #1 is paired with the job-executing node 200B of node #2, and data output from a job "Job c1" executed at node #1 and a job "Job c2" executed at node #2 is made redundant.

Specifically, data of "Job c1" executed by node #1 is stored in the disk for own system 260A and the disk for other system 270B, and data of "Job c2" executed by node #2 is stored in the disk for own system 260B and the disk for other system 270A. The job-executing node 200C of node #3 is an empty node to which no job has been allocated by the job control unit 140.

Assume that node #1 breaks down after a failure occurs. As shown in FIG. 5B, when the failure detecting unit 150 detects the failure at node #1, the job control unit 140 designates the empty node #3 as a substitute node for node #1, and performs a process of transferring the job and data held at node #1 where the failure occurred to node #3 that is now the substitute node.

Specifically, the job control unit 140 restores the data stored in the disk for own system 260A and the disk for other system 270B of node #1. That is, the job control unit 140 makes commands such that the data from the disk for other system 270B of node #2 (which is the same data as that stored in the disk for own system 260A of node #1) is copied to a disk for own system 260C of node #3, and the data from the disk for own system 260B of node #2 (which is the same data as that stored in the disk for other system 270A of node #1) is copied to a disk for other system 270C of node #3. The data held by node #1 is thus restored at node #3.

The job control unit 140 passes the job "Job c1" that was being executed by node #1 where the failure occurred to node #3 where the data has been restored. The job held by node #1 is thereby transferred to node #3.

The job control unit 140 then arranges node #2 and node #3 in a pair, storing data of node #2 in the disk for own system 260B and in the disk for other system 270C and storing data of node #3 in the disk for own system 260C and in the disk for other system 270B, thereby making data redundant between the two nodes (node #2 and node #3).

Even when a failure occurs in node #1, it is possible to continue storing data in the partner destination node that is made redundant (i.e., node #2) if the failure is a disk failure in the disk for own system 260A and the disk for other system 270A of node #1 itself. Therefore, the job control unit 140 need not regard this failure as urgent, and can allow node #1 to continue executing the job without changing the configuration of the pair, while storing data of that job only in the disk for other system 270B of node #2.

In this manner, when the failure detecting unit 150 detects a failure node where a failure occurs, the job control unit 140 selects a substitute node from among the job-executing nodes 200, and makes commands such that data, which is generated by the job being executed by the failure node and stored in the disk for other system of the node paired with it, is copied to the substitute node, and such that data, which is generated by the job being executed by the node paired with the failure node and stored in the disk for own system of the node, is copied to the substitute node. The job allocated to the failure node is allocated to the substitute node that the data is copied to.

Therefore, the job and the data allocated to the failure node prior to its failure can be restored together at the substitute node.

Figure 6:
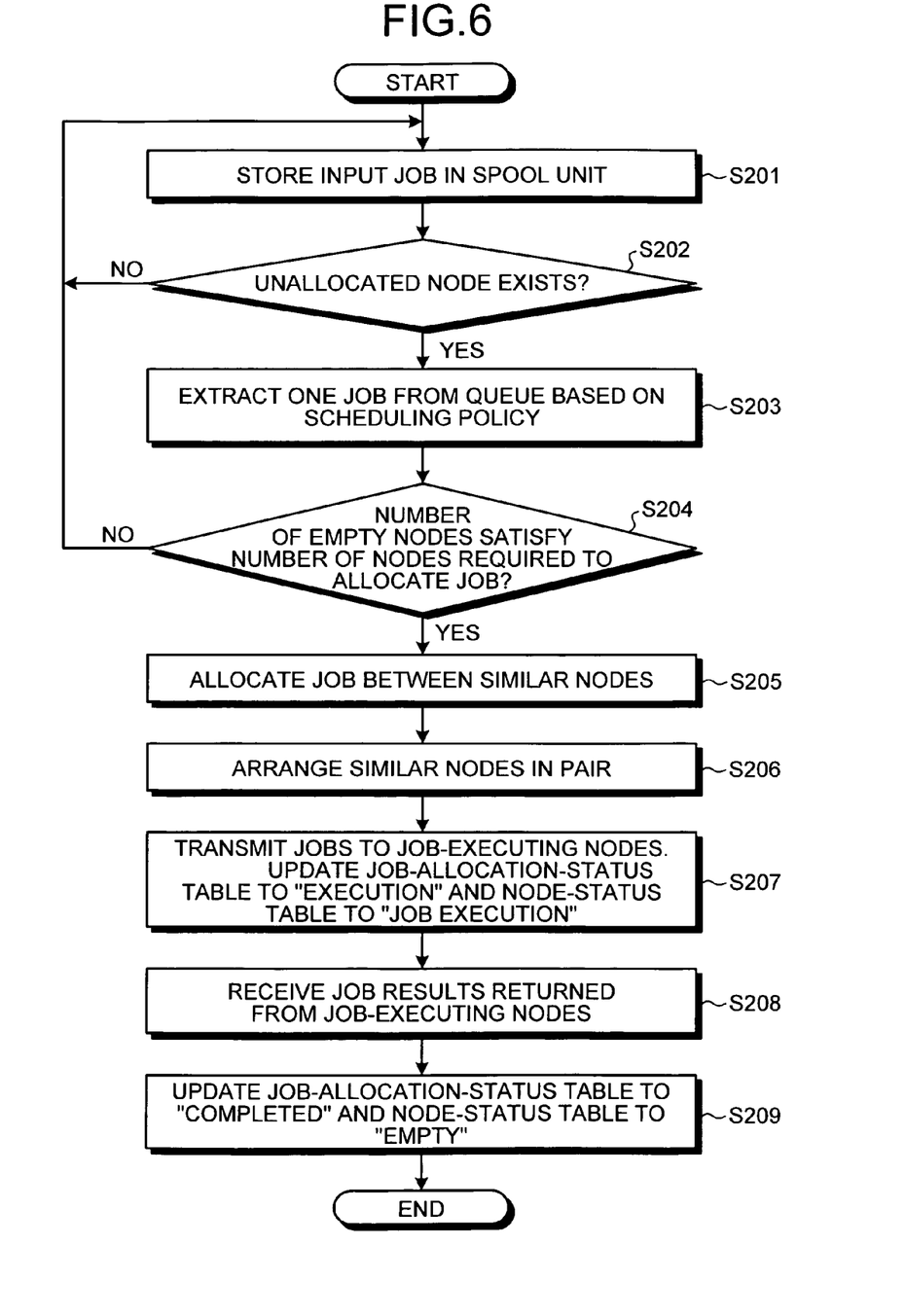
FIG. 6 is a flowchart of a process procedure for job allocation performed by a control server.

FIG. 6 is a flowchart of the process procedure for job allocation performed by the control server 100. As shown in FIG. 6, when a user inputs a job, the job scheduler 141 stores data of the input job in the spool unit 120 (step S201). At this time, the job scheduler 141 allocates a job number to the job, adds an entry for that job to the job-allocation-status table 131, and sets the corresponding job status in the job-allocation-status table 131 to "Queue".

The job scheduler 141 then determines whether there are any unallocated nodes by referring to the node-status table 132 (step S202). Specifically, the job scheduler 141 determines whether there are any nodes having a node status of "Empty" in the node-status table 132.

Accordingly, when there are no unallocated nodes, the job scheduler 141 returns to step S201 and continues storing jobs input by the user until an unallocated node appears. On the other hand, when there are unallocated nodes, the job scheduler 141 extracts one job from the standby queue in the spool unit 120 in compliance with a predetermined scheduling policy based on the job control command information (step S203).

The job scheduler 141 then determines whether the number of empty nodes satisfies the number of nodes required for allocating the extracted job (step S204). Specifically, based on the job control command information of the job extracted from the spool unit 120, the job scheduler 141 determines whether the number of "Empty" nodes in the node-status table 132 satisfies the number of nodes required for allocating that job.

Accordingly, when the number of nodes required for job allocation is not satisfied, the job scheduler 141 returns to step S201 and continues storing jobs input from the user until the required number of nodes is satisfied.

On the other hand, when the required number of nodes is satisfied, the job scheduler 141 allocates the job to a job-executing node 200 in compliance with a predetermined algorithm policy, such that jobs of mutually similar types are allocated to two mutually similar job-executing nodes 200. Specifically, the job scheduler 141 determines whether the two job-executing nodes 200 have short network distances and similar positions, or whether their job processing speeds and processing capabilities are similar, and allocates jobs to the job-executing nodes 200 based on the determination result (step S205).

The pair-group manager 142 arranges the two mutually similar job-executing nodes 200 selected by the job scheduler 141 into a pair and stores this result in the pair-group-configuration table 133 (step S206).

The job scheduler 141 transmits the jobs to the job-executing nodes 200 that are determined as allocated destination nodes, and makes them execute those jobs. In addition, the job scheduler 141 changes the job statuses of the jobs in the job-allocation-status table 131 to "Execution", and changes the node status of each node that a job is transmitted to in the node-status table 132 to "Job Execution" (step S207).

The job-executing nodes 200 that receive the jobs execute them, and, when the job control unit 140 receives execution results of the jobs or execution midway results of jobs that are canceled by users midway during their execution (step S208), the job scheduler 141 changes the job statuses corresponding to the jobs whose execution results are received to "Completed" in the job-allocation-status table 131, and changes their node statuses in the node-status table 132 to "Empty" (step S209), whereby the job allocation process ends.

In this manner, the job scheduler 141 arranges mutually similar pairs of job-executing nodes 200 and allocates jobs to them, and the pair-group manager 142 makes data generated when the jobs are executed by selected allocation nodes mutually redundant between the paired job-executing nodes 200. It is therefore possible to maintain the storage reliability of the overall cluster while increasing its processing efficiency.

Figure 7:
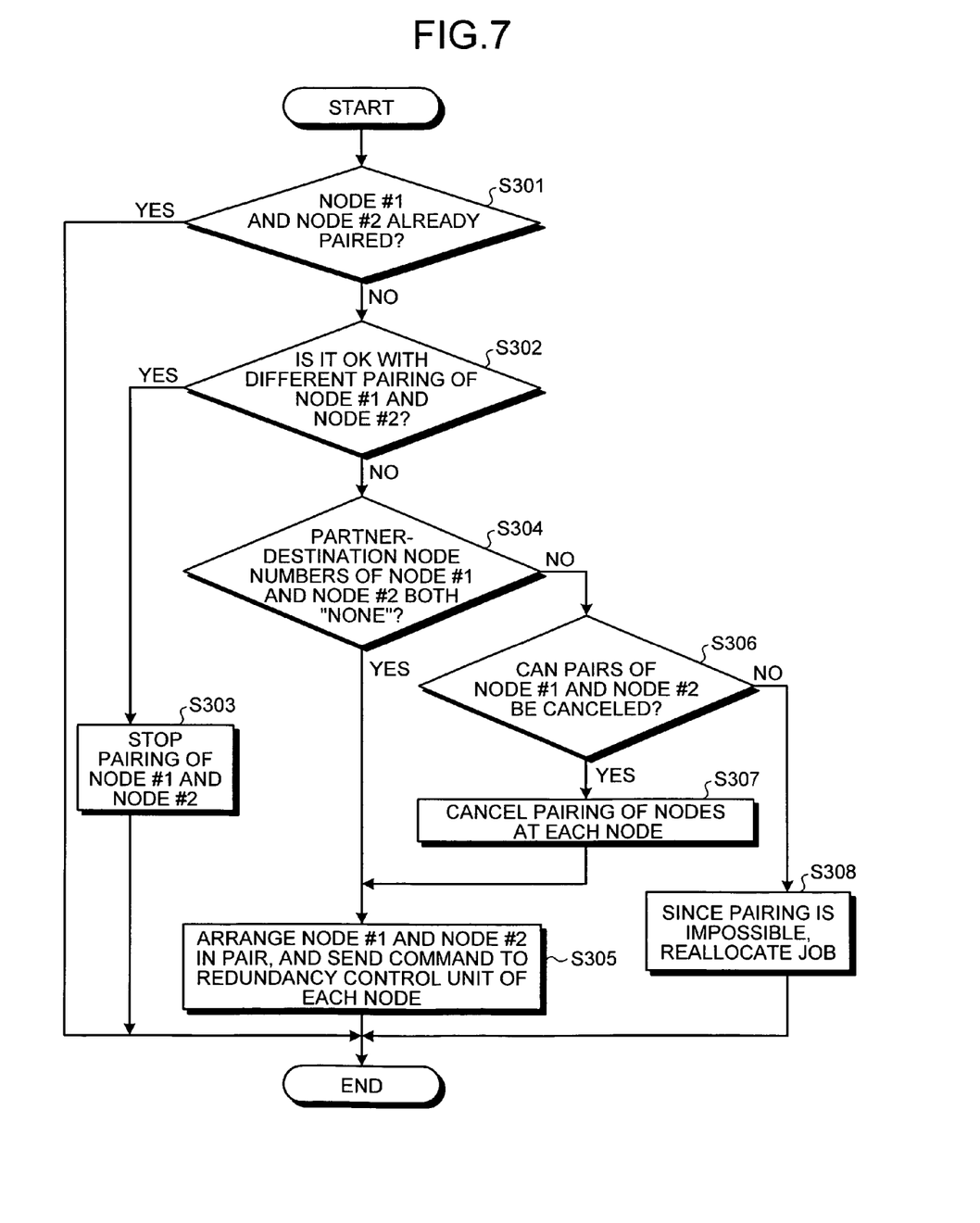
FIG. 7 is a flowchart of a pair configuration process procedure performed by a pair-group manager.

FIG. 7 is a flowchart of a pair configuration process procedure performed by the pair-group manager 142. In the example shown in FIG. 7, the job scheduler 141 selects node #1 and node #2 as two mutually similar job-executing nodes 200, and the pair-group manager 142 arranges these job-executing nodes 200 in a pair.

As shown in FIG. 7, the pair-group manager 142 refers to the pair-group-configuration table 133, and determines whether nodes #1 and #2 selected by the job scheduler 141 are already arranged in a pair (step S301).

Accordingly, if node #1 and node #2 are already arranged in a pair, the pair-group manager 142 keeps them in this paired arrangement and the pair configuration process ends.

On the other hand, if node #1 and node #2 are not arranged in a pair, the pair-group manager 142 determines whether they are acceptably left as they are, in separate pairs with other nodes that they are currently paired with, due to their having a small amount of job data or another such reason (step S302). This determination is based on the job control command information contained in the jobs being executed by node #1 and node #2.

Accordingly, when the pair-group manager 142 determines that node #1 and node #2 are acceptably left in separate pairs, it stops the process of arranging them into a pair (step S303) and the pair configuration process ends with node #1 and node #2 left in separate pairs.

On the other hand, when the pair-group manager 142 determines that it is not acceptable to leave node #1 and node #2 in separate pairs, it determines whether the partner-destination node numbers of node #1 and node #2 in the pair-group-configuration table 133 are "None" (step S304).

Accordingly, when both the partner-destination node numbers are "None", the pair-group manager 142 promptly performs a process of arranging node #1 and node #2 in a pair. In the pair-group-configuration table 133, the pair-group manager 142 changes the partner-destination node number of node #1 to "Node #2", and changes the partner-destination node number of node #2 to "Node #1", thereby arranging them in a pair. In addition, the pair-group manager 142 notifies the redundancy control units 230A and 230B of nodes #1 and #2 of the partner destination nodes arranged in the pair (step S305), whereby the pair configuration process ends.

On the other hand, when at least one of the partner-destination node numbers is not "None", which is, when at least one of the nodes is already paired with another node, if the data is made redundant in this state, the partner destination node will be duplicated and the redundant data stored at this partner destination node will be destroyed. Therefore, based on the job control command information, the pair-group manager 142 determines whether it is possible to cancel the pair containing node #1 and the pair containing node #2 (step S306).

Accordingly, when the pair-group manager 142 determines that both pairs can be canceled, it cancels the pairs containing the other node paired with node #1 and the other node paired with node #2 (step S307), and shifts to step S305 to perform a process of arranging node #1 and node #2 in a pair together.

On the other hand, when the pair-group manager 142 determines that the pair configurations cannot be canceled, since node #1 cannot be arranged in a pair with node #2, the pair-group manager 142 sends a request to reallocate the jobs to similar nodes to the job scheduler 141 (step S308), whereby the pair configuration process ends.

In this manner, when at least one of the two nodes selected by the job scheduler 141 is already paired with another node, the pair-group manager 142 cancels the existing pair(s) and arranges the two nodes in a new pair. This can prevent destruction of redundant data due to duplicated partner destination nodes.

Figure 8:
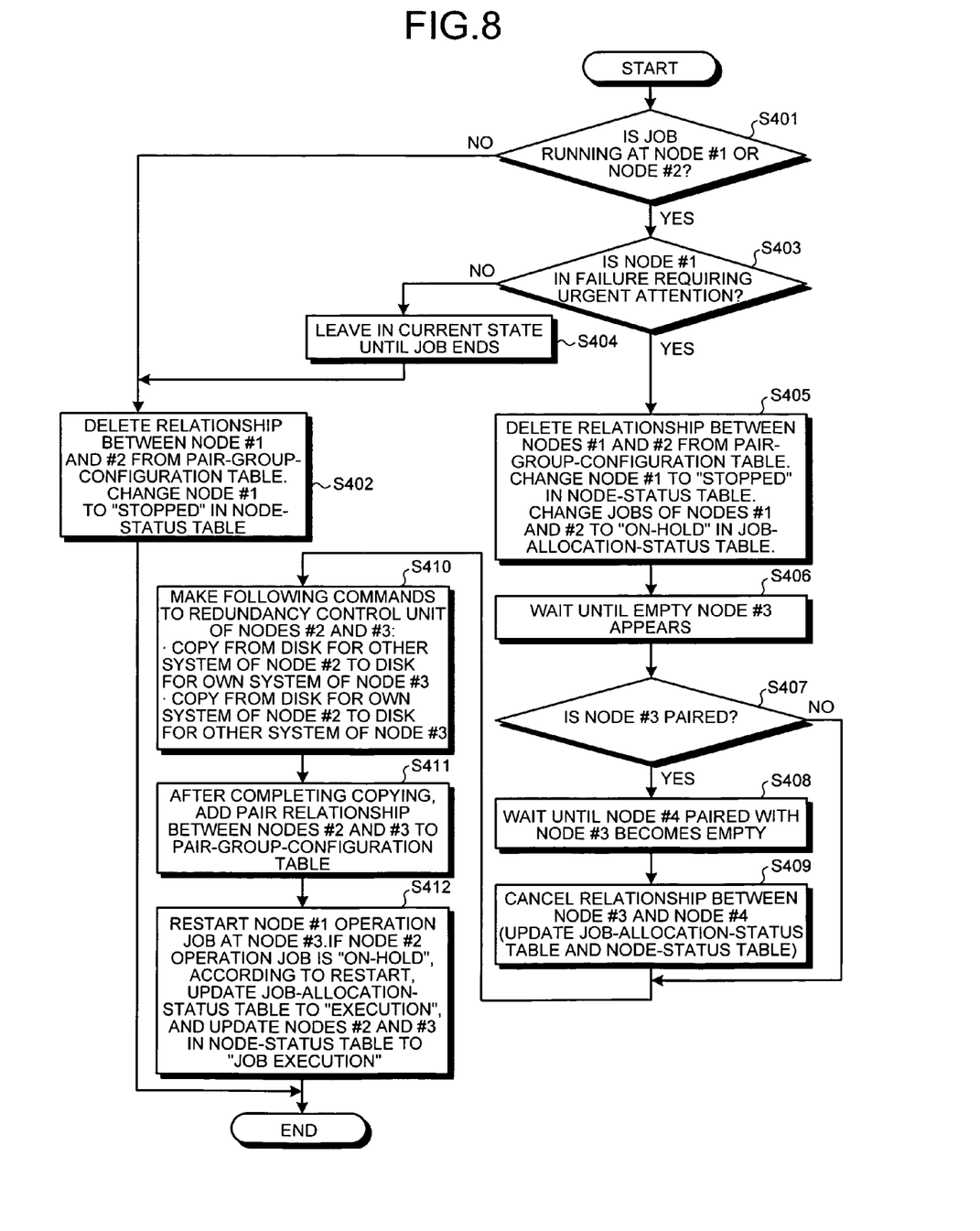
FIG. 8 is a flowchart of a process procedure of failure restoration performed by a job control unit when a failure occurs.

FIG. 8 is a flowchart of the process procedure of failure restoration performed by the job control unit 140 when a failure occurs. The failure restoration process in FIG. 8 is performed when the failure detecting unit 150 detects a failure in any of the job-executing nodes 200.

In the example shown in FIG. 8, the job-executing node 200 where the failure occurs is "node #1", the job-executing node 200 arranged in a pair with the failure node #1 is "node #2", and the job-executing node 200 that becomes a substitute node for the failure node #1 is "node #3".

When the failure detecting unit 150 detects a failure that occurs in the job-executing node 200 of node #1, the pair-group manager 142 of the job control unit 140 determines whether jobs are currently running at the failure node #1 and at node #2 that is paired with it (step S401). Specifically, the pair-group manager 142 determines whether at least one of node #1 and node #2 has a node status of "Job Execution" in the node-status table 132.

Accordingly, when either one of node #1 and node #2 has a node status other than "Job Execution", since there is no need to restore jobs and data, the pair-group manager 142 promptly cancels the relationship between node #1 and node #2 by changing their partner-destination node numbers in the pair-group-configuration table 133 to "None". In addition, the pair-group manager 142 changes the node status of node #1 in the node-status table 132 to "Stopped" such as to stop allocation of jobs to node #1 (step S402), whereby the failure restoration process ends.

On the other hand, when at least one of node #1 and node #2 has a node status of "Job Execution", the pair-group manager 142 determines whether the failure at node #1 requires urgent attention, based on the failure type and the job control command information contained in the job allocated to node #1 (step S403).

Accordingly, when it is determined that the failure at node #1 is one that does not require urgent attention, such as a disk failure that allows jobs to be continued, the pair-group manager 142 maintains the current state until the job is completed without changing the configuration of the pair (step S404), and, after the job is completed, shifts to step S402.

On the other hand, when it is determined that the failure at node #1 requires urgent attention, the pair-group manager 142 performs a process of changing the configuration of the pair. The pair-group manager 142 cancels the relationship between node #1 and node #2 by changing their partner-destination node numbers in the pair-group-configuration table 133 to "None", changes the node status of node #1 in the node-status table 132 to "Stopped", and changes the job statuses of the jobs allocated to them in the job-allocation-status table 131 to "On-Hold" (step S405).

The pair-group manager 142 waits until an empty node appears (node #3 in this example) and the node status of node #2 in the node-status table 132 becomes "Empty" (step S406). When the node status of node #3 becomes "Empty", the pair-group manager 142 determines whether the empty node #3 is currently arranged in a pair with another node by referring to the pair-group-configuration table 133 (step S407).

Accordingly, if node #3 is paired with another node, the pair-group manager 142 performs a process such as waiting until the partner destination node of that pair (e.g., node #4) becomes an empty node (step S408). After node #4 becomes an empty node, the pair-group manager 142 changes the partner-destination node numbers of node #3 and node #4 in the pair-group-configuration table 133 to "None" (step S409). At this time, the pair-group manager 142 also updates all items of the job-allocation-status table 131 and the node-status table 132 that relate to node #3 and node #4.

On the other hand, when node #3 is not paired with another node, the processes of steps S408 to S409 are not performed.

The pair-group manager 142 then performs a process of transferring the data stored in the disk for own system 260A and the disk for other system 270A of the failure node #1 to node #3. To the redundancy control unit 230B of node #2 and the redundancy control unit 230C of node #3, the pair-group manager 142 transmits a command to copy data that is output from node #1 and stored in the disk for other system 270B of node #3 to the disk for other system 270B of node #2, and a command to copy data from the disk for own system 260B of node #2, which stores the same data as that stored in the disk for other system 270A of node #1, to the disk for other system 270C of node #3 (step S410). This process restores the data held by node #1 at the time of its failure to node #3.

When the data held by node #1 is restored by copying it to node #3, the pair-group manager 142 changes the partner-destination node number of node #2 to "Node #3", and changes the partner-destination node number of node #3 to "Node #2", thereby giving them paired relationship (step S411).

The job scheduler 141 transfers the job being executed by the failure node #1 to node #3, and makes node #3 resume the job. If the job status of node #2 in the job-allocation-status table 131 at this time is "On-Hold", the job scheduler 141 allows it to resume the job at node #2 and changes its job status to "Execution". In conjunction with the transfer of this job, the job scheduler 141 changes the job status of the job in the job-allocation-status table 131 to "Execution", changes the node number of its allocation node, and changes its node status in the node-status table 132 to "Job Execution" (step S412). The job control unit 140 then ends the failure restoration process. Although the job is resumed after restoring the data in this example, it can also be resumed while the data is being restored.

In this manner, when the failure detecting unit 150 detects a failure node where a failure occurs, the pair-group manager 142 selects a substitute node from among the job-executing nodes 200, copies data, which is generated by executing a job at the failure node and stored in the disk for other system of the node paired with it, to the substitute node, and copies data, which is generated by executing a job at the node paired with the failure node and stored in the disk for own system of that node, to the substitute node, and the job scheduler 141 allocates the job that has been allocated to the failure node to the substitute node where the data has been restored. Therefore, the job and the data being stored at the failure node before the failure occurred can be restored together at the substitute node.

As described above, according to an embodiment of the present embodiment, the job control unit 140 selects, from among the job-executing nodes 200, the node 200A for allocating jobs and the node 200B that is similar to this allocation node, and makes a command such that data generated when the selected allocation node 200A executes a job is stored in the allocation node 200A and the similar node 200B. Therefore, the load on the overall cluster can be suppressed to a minimum while making data redundant between the nodes. Even with an inexpensive configuration, this can obtain a computation processing capability that matches the scale of the cluster.

Furthermore, according to an embodiment of the present embodiment, data is made redundant after pairing two job-executing nodes 200 together, the invention can be similarly applied when the job-executing nodes 200 are arranged in groups of three nodes or more. For example, when three job-executing nodes 200 (node #1, node #2, and node #3) are arranged in a group, data from node #1 is stored in the disk for other system of node #2, data from node #2 is stored in the disk for other system of node #3, and data from node #3 is stored in the disk for other system of node #1. This enables data to be made redundant among the three job-executing nodes 200 in this group. Moreover, when a failure occurs at node #3, and node #4 is designated as a substitute node for node #3, the control server 100 copies data stored in the disk for other system of node #1 to the disk for own system of node #4, and copies data stored in the disk for own system of node #2 to the disk for other system of node #4. This enables the data held at node #3 to be transferred to node #4.

Moreover, according to an embodiment of the present embodiment, the failure detecting unit 150 that detects failures is provided only in the control server 100, the failure detecting unit 150 can also be provided in the job-executing nodes 200, and, when a job-executing node 200 detects a failure at its partner destination node, it can make the control server 100 restore the failure. This configuration increases the failure detection precision at the job-executing nodes 200, and enables failures to be detected earlier.

Furthermore, according to an embodiment of the present embodiment, the load on the overall cluster can be suppressed to a minimum while making data redundant between the nodes. Therefore, even with an inexpensive configuration, a computation processing capability that matches the scale of the cluster can be obtained.

Moreover, according to an embodiment of the present embodiment, the network load when making data redundant between nodes can be reduced, enabling the processing efficiency of the overall cluster to be improved.

Furthermore, according to an embodiment of the present embodiment, the difference in processing speeds when making data redundant between nodes can be reduced, enabling the processing efficiency of the overall cluster to be improved.

Moreover, according to an embodiment of the present embodiment, the jobs and data held at a failure node prior to its failure can be transferred to a substitute node. Therefore, the availability of the overall cluster can be improved.

Furthermore, according to an embodiment of the present embodiment, the redundant data can be prevented from being destroyed due to selection of duplicate similar nodes. Therefore, the storage reliability of the overall cluster can be improved.

Moreover, according to an embodiment of the present embodiment, jobs of mutually different types can be executed in parallel without making a distinction between active nodes and standby nodes. Therefore, the processing efficiency of the overall cluster can be improved.

Furthermore, according to an embodiment of the present embodiment, two nodes can be arranged in a pair and data they store can be made redundant between them. Therefore, the storage reliability of the overall cluster can be maintained while increasing its processing efficiency.

Moreover, according to an embodiment of the present embodiment, synchronism between data output by jobs can be easily achieved when storing the data. Therefore, the processing efficiency of the overall cluster can be improved.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable, non-transitory medium that stores a computer program for controlling an allocation of a job to each node in a cluster system formed by mutually connecting a plurality of nodes by a high-speed network, wherein the computer program causes a computer to execute:
first selecting a first allocation node for allocating a first job;
second selecting a first similar node, a network distance between the first similar node and the first allocation node being close, or a job processing speed of the first similar node being close to a job processing speed of the first allocation node;
third selecting a second allocation node for allocating a second job;
fourth selecting a second similar node, a network distance between the second similar node and the second allocation node being close, or a job processing speed of the second similar node being close to a job processing speed of the second allocation node, the second similar node being different from the first similar node;
arranging the first allocation node and the first similar node in a pair;
arranging the second allocation node and the second similar node in a pair;
issuing a command to the first allocation node to store data created from the first job executed by the first allocation node in the first allocation node and to redundantly store the data in the first similar node; and
issuing a command to the second allocation node to store data created from the second job executed by the second allocation node in the second allocation node and to redundantly store the data in the second similar node.

2. The computer-readable, non-transitory medium according to claim 1, wherein
the computer program further causes the computer to execute:
detecting a failure node where a failure occurred;
data restoring including
selecting, when a failure node is detected at the detecting, a substitute node for the failure node;
issuing a command to the first similar node to copy data stored in the first similar node by the first job executed by the failure node selected as the first allocation node at the first selecting to the substitute node; and
issuing a command to an allocation node to copy data stored in the allocation node by the job executed by the allocation node selected as the first similar node selected at the second selecting for the failure node selected as the first allocation node at the first selecting to the substitute node; and
allocating the first job allocated to the failure node to the substitute node.

3. The computer-readable, non-transitory medium according to claim 1, wherein
the first similar node and the second allocation node are formed by same node.

4. The computer-readable, non-transitory medium according to claim 3, wherein
the first allocation node and the second similar node are formed by same node.

5. The computer-readable, non-transitory medium according to claim 1, wherein
a type of the first job is similar to a type of the second job.

6. A method of controlling an allocation of a job to each node in a cluster system formed by mutually connecting a plurality of nodes by a high-speed network, the method comprising:
node selecting including
first selecting a first allocation node for allocating a first job;
second selecting a first similar node, a network distance between the first similar node and the first allocation node being close, or a job processing speed of the first similar node being close to a job processing speed of the first allocation node;
third selecting a second allocation node for allocating a second job;
fourth selecting a second similar node, a network distance between the second similar node and the second allocation node being close, or a job processing speed of the second similar node being close to a job processing speed of the second allocation node, the second similar node being different from the first similar node;
arranging the first allocation node and the first similar node in a pair; and
arranging the second allocation node and the second similar node in a pair; and
command issuing including
issuing a command to the first allocation node to store data created from the first job executed by the first allocation node in the first allocation node and to redundantly store the data in the first similar node; and
issuing a command to the second allocation node to store data created from the second job executed by the second allocation node in the second allocation node and to redundantly store the data in the second similar node.

7. The method according to claim 6, further comprising:
detecting a failure node where a failure occurred;
data restoring including
selecting, when a failure node is detected at the detecting, a substitute node for the failure node;
issuing a command to the first similar node to copy data stored in the first similar node by the first job executed by the failure node selected as the first allocation node at the first selecting of the node selecting to the substitute node; and
issuing a command to an allocation node to copy data stored in the allocation node by the job executed by the allocation node selected as the first similar node selected at the second selecting of the node selecting for the failure node selected as the first allocation node at the first selecting of the node selecting to the substitute node; and
allocating the first job allocated to the failure node to the substitute node.

8. A cluster control apparatus that controls an allocation of a job to each node in a cluster system formed by mutually connecting a plurality of nodes by a high-speed network, the cluster control apparatus comprising:
a node selecting unit that selects a first allocation node for allocating a first job, selects a first similar node, a network distance between the first similar node and the allocation node being close, or a job processing speed of the first similar node being close to a job processing speed of the first allocation node, selects a second allocation node for allocating a second job, selects a second similar node, a network distance between the second similar node and the second allocation node being close, or a job processing speed of the second similar node being close to a job processing speed of the second allocation node, the second similar node being different from the first similar node, arranges the first allocation node and the first similar node in a pair, and arranges the second allocation node and the second similar node in a pair; and a data-redundancy command unit that issues a command to the first allocation node to store data created from the first job executed by the first allocation node in the first allocation node and to redundantly store the data in the first similar node, and issues a command to the second allocation node to store data created from the second job executed by the second allocation node in the second allocation node and to redundantly store the data in the second similar node.

9. The cluster control apparatus according to claim 8, further comprising:

a failure detecting unit that detects a failure node where a failure occurred;

a data restoring unit that selects, when the failure detecting unit detects a failure node, a substitute node for the failure node, issues a command to the first similar node to copy data stored in the first similar node by the first job executed by the failure node selected as the first allocation node by the node selecting unit to the substitute node, and issues a command to an allocation node to copy data stored in the allocation node by the job executed by the allocation node selected as the first similar node selected for the failure node selected as the first allocation node by the node selecting unit to the substitute node; and a job restoring unit that allocates the first job allocated to the failure node to the substitute node.

10. The computer-readable, non-transitory medium according to claim 1, wherein when the computer executes the issuing of the command, the computer program further causes the computer to execute:

transmitting the received command from the first allocation node to the first similar node through the network, and storing, by the first similar node, the data created from the first job executed by the first allocation node in the first similar node.

11. The method according to claim 6, wherein the command issuing further includes:

transmitting the received command from the first allocation node to the first similar node through the network, and storing, by the first similar node, the data created from the first job executed by the allocation node in the first similar node.

* * * * *